Patented May 13, 1941

2,241,705

UNITED STATES PATENT OFFICE 2,241,705

ONE-FIRE METHOD OF MANUFACTURING CERAMIC ARTICLES

Hobert R. Goodrich, Glendale, Calif., assignor to Gladding, McBean & Company, San Francisco, Calif., a corporation of California No Drawing. Application November 5, 1938, Serial No. 239,024

10 Claims. (Cl. 25—156)

This invention relates to a composition and method of manufacturing glazed ceramic products in a rapid and economical manner, without penalizing in any way the characteristics and attributes of ceramic products made by slower and more costly methods.

Although the teachings herein given refer to glazed wall tile, the same teachings may be applied to the manufacture of other pressed products, including glazed semi-porcelains.

Prevalent practice in the manufacture of ceramic glazed wall tile comprises a so-called two-fire method, consuming several days in the preparation and firing first, what is called the "bisque" and secondly, in the "glosting" operation.

A "bisque" or biscuit in the ceramic art is a prepared body of ceramic material which, after being shaped, has gone through a baking process and has hardened so that it becomes firm and strong and has a shape and other characteristics, except the glaze and color and possible additional features that may come to it from further burning. These bisque shapes are later coated with a combination of glaze materials and the shapes are then refired at a temperature, usually lower than the bisque temperature but sufficient for the development, by fusion, of the glaze finishes in a wide variety of colors and textures. This latter firing is known as the "glost" firing and the kilns used for this are known as "glost kilns."

Wall tile practice has, within comparatively recent years and following the coming into vogue of the manufacture of wall tile pursuant to the teachings of the Prouty Patent No. 1,628,910, dated May 17, 1927, come to recognize two distinct methods of manufacture, to-wit:

(1) the old clay body practice with a high alumina content of the body; and (2) the so-called talc body tile or magnesium silicate tile which is relatively low in alumina and relatively high in magnesia, as compared with the old clay body tile.

It has come to be well recognized that the magnesium silicates, when properly treated, have a marked advantage in the saving of time over the old clay body methods of manufacturing tile and also have marked advantages in the quality of the product.

For instance, under the old clay body method it frequently required as much as twenty-two days in making the clay bisque as compared with approximately four days for a magnesium silicate body; and, to complete a clay body tile, including the glosting, it would require approximately thirty to thirty-two days against seven days for the glosted and completed magnesium silicate or talc body tile.

By the present invention, the period of manufacture of a complete glazed tile is further reduced to approximately fourteen hours. It has been found possible, by choice of materials and novelty of treatment, to eliminate the costly bisque firing (usually at temperatures ranging around 2150° to 2300° Fahrenheit) and associated operations, and to accomplish, in a single glost firing operation, at usual glost temperatures (approximately about 1750° to 2050° Fahrenheit), the same equivalent results which are now only being accomplished by high firing for the development of strength in the bisque, later to be followed by a lower temperature firing for the development of the glaze.

These improved results have been accomplished, in part, by the choice of suitable minerals, as, for example, tremolite or wollastonite, possessing needle-like or elongated compact crystals which form a network with the other materials and thus reinforce and strengthen the body. This crystalline substance, of course, is associated with other substances and is subjected to such steps of treatment as will bring about the desired result and as hereinafter stated.

Tremolite (calcium magnesium silicate), for example, contains crystals which are free from volatile constituents which would disrupt the structure by their release during firing. Minerals or ores, such as dolomite and calcite, high in volatile matter, are particularly avoided, except in very small quantities. Other minerals or ores of a platy and soapy character, e. g. steatite, pyrophyllite and sericite, while satisfactory in reasonable amounts, are limited in permissible quantities, due to the content of volatile matter and also due to their tendencies to stick to the dies or to form laminations.

Plastic clays or bentonites as binders are employed. The grinding, sizing and the compacting of the minerals with the clay and water operate to form compact plates or lumps free from large cavities and air pockets, this mixture being subjected to pressing to give the desired shapes. The pressed shapes are then glazed and submitted to glost fire. Under some circumstances the shaped composition is given an intervening protective coating before the glaze is applied, as will be later described.

The possible saving to be made in the cost of manufacturing wall tile by the elimination of the bisqueing and associated operations, such as inspecting, sorting for size, grinding of oversize tile, refettling of edges, storage of bisque, etc., has been estimated to amount to as much as 20% of the total production cost.

By my process it has been found possible to accomplish the maturing of the body and glaze in as little as fourteen hours of time by firing to a maximum temperature within this normal glost temperature range.

In compounding the body mixture I use various amounts of plastic clays combined with elongated and compact crystals from the calcia and magnesia group of silicate minerals, e. g. tremolite and wollastonite, with or without their associated minerals, depending on the quality of the ore available; and with or without steatite, pyrophyllite, sericite or other minerals of the platy type.

The clay or bonding portion of the mixture is preferably one from the groups of more plastic clays, such as ball clays and bentonites, but considerable leniency will be found in the selection of a suitable clay. For example, I have obtained a satisfactory tile from a mixture composed of 15 parts English ball clay and 85 parts of a natural ore calculated and checked microscopically to be composed of 44.5 parts of tremolite to 47.7 parts of steatite, the balance being miscellaneous minerals.

One of the most satisfactory of my compositions has been made with a clay-like material formed, according to geologists, by the action of gases and solutions acting on rhyolites and removing most of the alkalies and iron and leaving a highly plastic alumina silicate. Following is a typical chemical analysis of this clay-like material:

| | |
|---|---|
| $SiO_2$ | 71.12 |
| $Al_2O_3$ | 14.49 |
| $Fe_2O_3$ | 0.71 |
| $MnO_2$ | 0.17 |
| $CaO$ | 0.24 |
| $MgO$ | 1.05 |
| $Na_2O$ and $K_2O$ | 0.79 |
| Ignition loss | 10.75 |
| | 99.32 |

This particular bonding material is further characterized by having a high drying shrinkage but a remarkably low firing shrinkage. For example, by comparison with the English ball clay mentioned before, the drying shrinkage of the ball clay is 7% while that of this clay is nearly 15%. The total drying and firing shrinkage of the ball clay was found to be nearly 22% at cone 6 while the similar shrinkage of this bentonitic clay was still near 15%, there not having been any appreciable shrinkage or expansion.

A typical composition using this aforementioned clay and which has been termed a bentonitic type of clay, or a bentonitic clay is as follows:

Example No. 1

| | Percent |
|---|---|
| Tremolitic ore | 50 |
| Steatite ore | 25 |
| Bentonitic clay | 25 |
| | 100 |

The tremolitic ore has a calculated mineral content of 63.2% of tremolite and 23.4% of steatite, the balance being dolomite, clay and silica. The steatite material in this case had a calculated content of 76.2% steatite, the balance being composed principally of calcite, dolomite and clay.

It has been found that a commercial batch of this mixture, prepared by means disclosed in another portion of this application, sprayed with glaze and fired in a single glost temperature fire has the following glazed properties:

Percent absorption____ 14.3
Modulus of rupture____ 4840 lbs. per sq. in.
Crazing resistance_____ Successfully withstood 25 quenches from boiling to ice water followed by 3 autoclave treatments for one hour each at 150 lbs. steam pressure.

A highly satisfactory tile has been produced from a mixture of 25% of clay with 75% of a mixture of calcia-magnesia-silicate ore, the resultant body containing about 39% of tremolite, 27% of steatite, 25% of clay, 9% of miscellaneous minerals, such as dolomite, clay, and potassium and sodium salts. The dry strength of the pressed mixture containing these minerals will be found to be much higher than certain other commercial compositions and the dry strengths have been determined to be as much as three times as strong as some present commercial bodies. Likewise the strengths as they come from the press and before drying will be found to be extremely high, thus permitting a rougher handling. This latter property is an important feature for those manufacturers who wish to produce tile having lugs on the side for spacing of the joints in a floor or wall. It is the practice to press such tile with the face down, and it then becomes necessary to turn these tile over in order to automatically fettle or rub down the sharp edges of the face. Tile made by my method are sufficiently tough to permit the automatic flipping over of the tile as they come from the press.

Example No. 2

| | Percent |
|---|---|
| Wollastonite ores | 85 |
| Plastic clay | 15 |
| | 100 |

Example No. 3

| | Percent |
|---|---|
| Tremolite | 65 |
| Steatite | 40 |
| Clay | 25 |
| | 100 |

Example No. 4

| | Percent |
|---|---|
| Tremolite | 65 |
| Clay | 35 |
| | 100 |

In short, it has been found that the proportions of these various substances can be varied within considerable limits. It has also been found that China clay or Florida kaolin, when used as a bonding material, resulted in bodies having good commercial characteristics. Steatite, which contains chemically combined water (theoretically 4.75%), is permissible and often desirable in amounts up to 50% of the body content and, in fact, has been used up to 60% of the body content.

The proper selection of the calcia and magnesia minerals is of considerably more importance than is the selection of the clay. It is possible, by correlating chemical analysis with microscopic study and with properties such as acid solubility and ignition loss, fairly accurately to calculate the percentages of the various minerals present in a calcia, magnesia silicate ore. By combining this information with practical laboratory test compositions and with factory trials, it has been possible to classify the desirable and the undesirable minerals found in the calcia-magnesia silicate groups.

The highly desirable minerals are from the group of calcia and magnesia silicates free from volatile constituents, such as water and carbon dioxide, and which are generally of the fibrous, compact, monoclinic or long bladed type of crystal structure. Typical minerals of this type are tremolite, $CaMg_3(SiO_3)_4$, and wollastonite, $(CaSiO_3)$, which, by their crystal shape, form with the associated minerals, such as steatite, and with the clay, an interlaced network of crystals and plastic mass, which, upon drying and firing at a glost heat, is unusually tough and strong.

It has been found that certain other minerals may be incorporated in the mixture outlined. For example, 25% of sericite or 12½% of sericite and 12½% of silica have been used with 25% of clay and 50% of material containing 56% of tremolite and 30% of steatite to form a very satisfactory product. This particular mixture requires the use of glazes having a lower coefficient of expansion, due to the lower expansion coefficient of the body. Similarly, it has been found that the other minerals, such as feldspar, mica, cornwall stone and pyrophyllite, may be used as adulterants for economy purposes, or for adjusting coefficient of expansion, or for other purposes, but these minerals are not considered a necessary part of this invention.

Sometimes it is advantageous to calcine a part of the calcia-magnesia silicate ores disclosed in this invention. This is often most advantageously done by calcining the crude lumps in a rotary, or tunnel, or periodic kiln before grinding. The materials may also be formed into shapes by adding water and sometimes clay and by them pressing, or extruding, or molding the material into such shapes and sizes that will expedite the calcining operation. The effect of the calcining operation is to free the materials of the volatile constituents, such as chlorine, carbon dioxide and water and also either to volatilize or fuse into a more stable form those compounds which might otherwise tend to form blisters during the firing of the product. Calcining temperatures should be at least as high as the glost temperatures, and it has been found that a temperature somewhat above this is safer to accomplish the purpose intended. The upper temperature limits are limited only by the materials themselves, but it will be found that the nearer the calcining temperature is kept to the glost temperature, the easier will be the grinding of the calcined material.

The ore, whether calcined or raw, is usually ground to approximately 200 mesh size. The ground material in suitable proportions is mixed with a sufficient quantity of water, varying according to the clay content of the mixture used or to the general plasticity of the mixture.

In practice, muller equipped mixers are used in the preparation of a satisfactory one-fired tile body. That is, the pressing and compacting of the mixture into hard plates and granules, later to be disintegrated into a suitable size for pressing, is, it is believed, essential for a satisfactory product.

During mixing, the mixture with the water is compacted by the mullers into hard compact plates and granules which are later passed through a blower or disintegrator and made available for immediate use, or aged for future use. Presses of standard type are used, the pressures varying from approximately one thousand pounds to several thousand pounds, depending on the type of press used. The pressed tile may be either mechanically or air dried and are then ready for the glosting operation without any intermediate bisque firing. They are then coated with the glaze composition and possibly also with an intervening protective coating, after which they are subjected to the glost firing.

It has been found that some calcia-magnesia ores contain certain compounds, such as, for example, calcium fluoride and calcium phosphate, which are attacked by the glaze during the single firing operation. The volatile constituents sometimes boil up from the tile body through the glaze, often leaving a crater-like effect in the glaze or else a pinhole, bubble or blister. This effect may often be overcome by a finer grinding of the particular constituent containing the harmful compound or else by lengthening the firing period or else by changing the firing temperature, or changing the glaze characteristic. However, for those conditions where it is not economically feasible to eliminate these troublesome compounds or to eliminate the difficulty by other means, I have developed as a part of this invention a treatment to overcome this difficulty. For this purpose, a protective layer of non-blistering material is applied over the body before the glaze application is made. This can readily and inexpensively be applied by spraying in a water suspension very similar to the glaze application and just prior to the glaze application.

It is necessary that the protective coating be of a mature semi-vitrified or vitrified nature and that in combination with the additional fluxing action brought about by contact with the glaze, it bond well with the body. The very satisfactory combinations of materials developed for this purpose have been tightened or fluxed with ground glass from various sources, such as scrap bottle and window glass. It is also possible to use for this purpose a wide range of melted compositions known to the trade as "frits." One of these that is comparatively inexpensive to make approaches in composition that of certain commercial glasses. Others have been of the type manufactured and sold on the market today and known as glaze and enamel frits. However, due to the cheaper cost of the ground glass, I prefer to use this material or to prepare a similar material for the purpose.

The other materials used in this protective coating should include a clay or clays for suspension purposes, together with filling materials. For the latter it has been found that the tile body itself, when calcined at or above the glost firing temperature, results in a very satisfactory material. For example, I have used the following composition for a protective coating:

| | Percent |
|---|---|
| Tile body bisqued at cone 6 | 45 |
| Bentonitic clay | 5 |
| China clay | 10 |
| Glass | 20 |
| Frit | 20 |
| | 100 |

Likewise, I have used other materials, such as silica, feldspar, calcia and magnesia minerals free from the blistering compounds, calcined calcia and magnesia minerals, etc. Various other materials are satisfactory, such as cornwall stone, sericite and pyrophyllite as the secret of success appears to be in the use with these materials, of glasses and frits that are softened by the glost fire heats.

For example, another composition that has been very satisfactory is:

| | Percent |
|---|---|
| Feldspar | 37 |
| Silica | 18 |
| Bentonitic clay | 5 |
| China clay | 10 |
| Glass | 30 |
| | 100 |

The principal reason for using the China clay is due to its whiteness, as it is desirable to have a light background for the glazes. These protective coatings may be used for other reasons than the one mentioned, as they have been found to be very efficient in covering over iron and other specks in the body. They also permit the use of off-colored minerals in the body.

In compounding these protective coatings, the materials, other than the soft clays, such as China clay, have been dry ground sufficiently so that about 95% of the material will pass a 200 mesh sieve. The ground materials have then been placed in a ball-mill, together with the soft clays and 80 parts of water to 100 parts, by weight, of dry materials. The purpose of such coatings is to cover up specks or blemishes; to prevent the formation of blisters or pinholes; to promote a uniform background color for the glazes; or to introduce decorative effects or colors to the product.

Whether or not the shapes to be fired are treated to this protective coating, they are sprayed or dipped with glazes; the glazes used on this composition being those typical of the various white and colored glazes in gloss, satin and matte finishes normally used on two-fired wall tile and having similar coefficients of expansion, to the mixtures disclosed in this invention. The fitting of a glaze to a ceramic body is a matter well known to those skilled in the art.

The next step is the glost firing. This may be done in standard glost firing kilns of the tunnel type in which the firing temperature is uniformly maintained within. The temperature employed will vary at different times and under different conditions from somewhere between 1750° Fahrenheit to 2050° Fahrenheit, but at whatever temperature is selected, the range of variation would be within very narrow limits or approximately 5° to 10° Fahrenheit. In actual practice a temperature of about 1950° Fahrenheit has been found satisfactory, with a 50° variation above or below. The period of glosting is approximately fourteen hours more or less. The glost temperature range indicated above is preferred because it has been found that it is within this range that the desirable brilliant and pure color tones are obtained.

It is well known amongst those skilled in the art that the same degree of purity and clearness of colors in glazes is not obtainable at the normal bisqueing temperatures as is obtainable at normal glost temperatures and it is largely for this reason that only a limited amount of glost firing is carried on at these higher heats, particularly in those fields of manufacture such as in colored wall tile where clearness of color is so highly desirable.

What I claim is:

1. The method of making in a single firing a ceramic unit comprising forming a mixture consisting of a material containing at least 35% of the minerals selected from the group consisting of calcium and calcium-magnesium containing silicates substantially free of volatile content tending to disrupt during firing the subsequently formed structure, said minerals being characterized by a fibrous compact blade-like structure, and a clay binder therefor, said mixture being substantially free of extraneously added fluxing materials, pressing and compacting the mixture into hard plates and granules, disintegrating the latter, pressing and shaping said disintegrated mixture, coating the shaped article with an intermediate protective coating, applying a glaze upon said coating, and maturing the article including the glaze at one firing at the glosting temperature.

2. The method of making in a single firing a ceramic unit comprising forming a mixture consisting of a material containing at least 35% of the minerals selected from the group consisting of calcium and calcium-magnesium containing silicates substantially free of volatile content tending to disrupt during firing the subsequently formed structure, said minerals being characterized by a fibrous compact blade-like structure, and a clay binder therefor, said mixture being substantially free of extraneously added fluxing materials, pressing and compacting the mixture into hard plates and granules, disintegrating the latter, pressing and shaping said disintegrated mixture, coating the shaped article with an intermediate protective coating containing calcined bisque body material, applying a glaze upon said coating, and maturing the article including the glaze at one firing at the glosting temperature.

3. The method of making in a single firing a glazed ceramic unit comprising forming a mixture consisting of a material containing at least 35% of minerals selected from the group consisting of calcium and calcium magnesium containing silicates, characterized by a fibrous compact monoclinic crystal structure, free of volatile content tending to disrupt during firing the subsequently formed structure, a diluting constituent substantially non-fluxing with the other body materials at the glosting temperature, and a clay binder; pressing and compacting the mixture into hard plates and granules, disintegrating the latter, pressing and shaping said disintegrated mixture, superimposing a glaze on the formed article, and subjecting the so-treated and shaped article to a single firing at the glosting temperature.

4. The method of making in a single firing a glazed ceramic unit comprising forming a mixture consisting of at least 35% of tremolite free of volatile content tending to disrupt during firing the subsequently formed structure, a diluting constituent substantially non-fluxing with the other body materials at the glosting temperature, and a clay binder, pressing and compacting the mixture into hard plates and granules, disintegrating the latter, pressing and shaping said disintegrated mixture, superimposing a glaze on the formed article, and subjecting the so-treated and shaped article to a single firing at the glosting temperature.

5. The method of making in a single firing a glazed ceramic unit comprising forming a mixture consisting of a material containing at least 35% of minerals selected from the group consisting of tremolite and wollastonite, said minerals being of a fibrous compact monoclinic crystal structure, free of volatile content tending to disrupt during firing the subsequently formed structure, a diluting constituent substantially non-fluxing with the other body materials at the glosting temperature, and a clay binder; pressing and compacting the mixture into hard plates and granules, disintegrating the latter, pressing and shaping said disintegrated mixture, superimposing a glaze on the formed article, and subjecting the so-treated and shaped article to a single firing at the glosting temperature.

6. The method of making in a single firing a glazed ceramic unit comprising forming a mixture consisting of a material containing at least 35% of minerals selected from the group consisting of calcium and calcium magnesium containing silicates, characterized by a fibrous compact monoclinic crystal structure, free of volatile content tending to disrupt during firing the subsequently formed structure, a diluting constituent substantially non-fluxing with the other body materials at the glosting temperature, and a clay binder of the bentonite type; pressing and compacting the mixture into hard plates and granules, disintegrating the latter, pressing and shaping said disintegrated mixture, superimposing a glaze on the formed article, and subjecting the so-treated and shaped article to a single firing at the glosting temperature.

7. The method of making in a single firing a glazed ceramic unit comprising forming a mixture consisting of a material containing at least 35% of minerals selected from the group consisting of calcium and calcium magnesium containing silicate characterized by a fibrous compact monoclinic crystal structure, free of volatile content tending to disrupt during firing the subsequently formed structure, and a clay binder, said mixture being substantially free of extraneously added fluxing materials adapted on firing to flux with the other body materials; pressing and compacting the mixture into hard plates and granules, disintegrating the latter, pressing and shaping said disintegrated mixture, superimposing a glaze on the formed article and subjecting the so-treated and shaped article to a single firing at the glosting temperature.

8. The method of making in a single firing a glazed ceramic unit comprising forming a mixture consisting of a material containing at least 35% of minerals selected from the group consisting of calcium and calcium magnesium containing silicates, characterized by a fibrous compact monoclinic crystal structure, free of volatile content tending to disrupt during firing the subsequently formed structure, a diluting constituent substantially non-fluxing with the other body materials at the glosting temperature, and a clay binder; pressing and compacting the mixture into hard plates and granules, disintegrating the latter, pressing and shaping said disintegrated mixture, superimposing a glaze on the formed article, and subjecting the so-treated and shaped article to a single firing at the glosting temperature varying between 1750 and 2050° F.

9. The method of making in a single firing a glazed ceramic unit comprising forming a mixture consisting of a material containing at least 35% of minerals selected from the group consisting of calcium and calcium magnesium containing silicates, characterized by a fibrous compact monoclinic crystal structure, free of volatile content tending to disrupt during firing the subsequently formed structure, a diluting constituent substantially non-fluxing with the other body materials at the glosting temperature, and a clay binder; pressing and compacting the mixture into hard plates and granules, disintegrating the latter, pressing and shaping said disintegrated mixture, superimposing a glaze on the formed article, and subjecting the so-treated and shaped article to a single firing at the glosting temperature of 1950° F.

10. The method of making in a single firing a glazed ceramic unit comprising forming a mixture consisting of a material containing at least 35% of minerals selected from the group consisting of calcium and calcium magnesium containing silicates, characterized by a fibrous compact monoclinic crystal structure, free of volatile content tending to disrupt during firing the subsequently formed structure, a diluting constituent substantially non-fluxing with the other body materials at the glosting temperature, and a clay binder, said mixture being substantially free of extraneously added fluxing materials adapted on firing to flux with the superimposed glaze at its zone of contact with the body material to thereby inhibit the glaze dissolving in and soaking into the body material; pressing and compacting the mixture into hard plates and granules, disintegrating the latter, pressing and shaping said disintegrated mixture, superimposing a glaze on the formed article, and subjecting the so-treated and shaped article to a single firing at the glosting temperature.

HOBERT R. GOODRICH.